United States Patent
Inoue (10) Patent No.: US 9,509,657 B2
(45) Date of Patent: Nov. 29, 2016

(54) INFORMATION PROCESSING APPARATUS, RELAY METHOD, AND COMPUTER-READABLE STORAGE MEDIUM

(71) Applicant: Naoya Inoue, Tokyo (JP)

(72) Inventor: Naoya Inoue, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 225 days.

(21) Appl. No.: 14/207,407

(22) Filed: Mar. 12, 2014

(65) Prior Publication Data

US 2014/0281033 A1 Sep. 18, 2014

(30) Foreign Application Priority Data

Mar. 15, 2013 (JP) ................................. 2013-054423

(51) Int. Cl.
*G06F 15/16* (2006.01)
*H04L 29/12* (2006.01)

(52) U.S. Cl.
CPC ................................. *H04L 61/2007* (2013.01)

(58) Field of Classification Search
CPC ............... H04L 61/2007; H04L 61/25; H04L 61/2503; H04L 61/2521; H04L 61/2525; H04L 61/2528; H04L 41/0226; H04L 12/2405
USPC ........................................ 709/245, 223, 225
See application file for complete search history.

(56) References Cited

U.S. PATENT DOCUMENTS

| 7,624,195 | B1* | 11/2009 | Biswas | H04L 29/12283 370/389 |
|---|---|---|---|---|
| 2001/0036184 | A1* | 11/2001 | Kinoshita | H04L 29/12367 370/389 |
| 2002/0023152 | A1* | 2/2002 | Oguchi | H04L 29/12066 709/223 |
| 2002/0061011 | A1* | 5/2002 | Wan | 370/352 |
| 2002/0133582 | A1* | 9/2002 | Shibata | H04L 29/12009 709/223 |
| 2002/0191576 | A1* | 12/2002 | Inoue | H04L 12/4641 370/338 |

(Continued)

FOREIGN PATENT DOCUMENTS

| JP | 2007-251568 | 9/2007 |
|---|---|---|
| JP | 2009-296419 | 12/2009 |
| JP | 2010-199738 | 9/2010 |

*Primary Examiner* — Thu Ha Nguyen
(74) *Attorney, Agent, or Firm* — Duft Bornsen & Fettig LLP (57) ABSTRACT

An information processing apparatus includes a receiving unit configured to receive request data to an application via a global network allocated to the information processing apparatus, the request data including a global address specified as a destination address; a determination unit configured to determine, based on the request data, whether the application is to be executed by another apparatus connected via a private network and allocated with a private address; a change unit configured to change the destination address in the request data from the global address of the information processing apparatus to the private address of the another apparatus when the determination unit determines that the application is to be executed by the another apparatus; and a transmission unit configured to transfer, to the another apparatus, the request data including the private address of the another apparatus as the destination address.

6 Claims, 8 Drawing Sheets

(56) References Cited

U.S. PATENT DOCUMENTS

| | | | | |
|---|---|---|---|---|
| 2006/0209823 A1* | 9/2006 | Wan | | 370/389 |
| 2006/0259583 A1* | 11/2006 | Matsuura | | 709/218 |
| 2006/0268861 A1* | 11/2006 | Sonoda | H04L 29/12009 | 370/389 |
| 2008/0062917 A1* | 3/2008 | Oguchi | H04L 67/14 | 370/328 |
| 2008/0069092 A1* | 3/2008 | Koyama | H04L 12/2854 | 370/389 |
| 2008/0123646 A1* | 5/2008 | Gobara | H04L 29/12367 | 370/390 |
| 2010/0115080 A1* | 5/2010 | Kageyama | H04L 29/12028 | 709/223 |
| 2010/0175123 A1* | 7/2010 | Karino | H04L 29/12377 | 726/12 |
| 2011/0299538 A1 | 12/2011 | Maruta | | |
| 2013/0086245 A1* | 4/2013 | Lu | G05B 13/02 | 709/223 |

* cited by examiner

RELAY DATA

| RELAY DESTINATION IP ADDRESS | RELAY DESTINATION PORT NUMBER | APPLICATION DATA |
|---|---|---|

INFORMATION PROCESSING APPARATUS, RELAY METHOD, AND COMPUTER-READABLE STORAGE MEDIUM

CROSS-REFERENCE TO RELATED APPLICATION

The present application claims priority to and incorporates by reference the entire contents of Japanese Patent Application No. 2013-054423 filed in Japan on Mar. 15, 2013.

BACKGROUND OF THE INVENTION

1. Field of the Invention

The present invention relates to an information processing apparatus, a relay method, and a computer program.

2. Description of the Related Art

One configuration of printing apparatuses and the like is a single printing apparatus including a plurality of computers each assigned with a unique IP address. In such a configuration, the single printing apparatus holds a plurality of IP addresses and thus management of this apparatus on a network as a single device is difficult and complicated. Therefore, there is a need to unify the IP addresses of the plurality of computers forming the printing apparatus into a single IP address.

Thus, a known technique is to unify IP addresses of a plurality of computers installed in a single printing apparatus into a single IP address by a network address port translation (NAPT) router that rewrites an IP address and a port number to be transferred, thereby realizing many-to-one communications between a global space and a private network space in which the computers forming the single printing apparatus are connected to each other.

For example, Japanese Laid-Open Patent Application No. 2010-199738 discloses a technique of an address conversion apparatus that relays communications between a global network area and a private network area in order to facilitate management of terminals.

However, these address conversion apparatuses of the conventional techniques have a problem that assigning of communication data is difficult when the computers (devices), which are within the private network and installed in the single apparatus such as a printing apparatus, execute applications such as Web services that use a same port number among these applications.

Therefore, there is a need to provide an information processing apparatus, a relay method, and a computer-readable storage medium, which are able to readily assign communication data, even if devices, which are installed in a single apparatus and are within a private network, execute applications that use a same port number among these applications.

SUMMARY OF THE INVENTION

It is an object of the present invention to at least partially solve the problems in the conventional technology.

According to an embodiment, there is provided an information processing apparatus that includes a receiving unit configured to receive request data to an application via a global network, the request data including a global address specified as a destination address, the global address being allocated to the information processing apparatus connected to the global network. The information processing apparatus also includes a determination unit configured to determine, based on the request data, whether the application specified by the request data is to be executed by another information processing apparatus connected via a private network and allocated with a private address; a change unit configured to change the destination address in the request data from the global address of the information processing apparatus to the private address of the another information processing apparatus when the determination unit determines that the application specified by the request data is to be executed by the another information processing apparatus; and a transmission unit configured to transfer, to the another information processing apparatus, the request data including the private address of the another information processing apparatus as the destination address.

According to another embodiment, there is provided a relay method executed by an information processing apparatus connected to a global network. The relay method includes receiving request data to an application via the global network, the request data including a global address specified as a destination address, the global address being allocated to the information processing apparatus; determining, based on the request data, whether the application specified by the request data is to be executed by another information processing apparatus connected via a private network and allocated with a private address; changing the destination address in the request data from the global address of the information processing apparatus to the private address of the another information processing apparatus when it is determined that the application specified by the request data is to be executed by the another information processing apparatus; and transferring, to the another information processing apparatus, the request data including the private address of the another information processing apparatus as the destination address.

According to still another embodiment, there is provided a non-transitory computer-readable storage medium with an executable program stored thereon and executed by a computer connected to a global network. The program instructs the computer to perform: receiving request data to an application via the global network, the request data including a global address specified as a destination address, the global address being allocated to the computer; determining, based on the request data, whether the application specified by the request data is to be executed by another computer connected via a private network and allocated with a private address; changing the destination address in the request data from the global address of the computer to the private address of the another computer when it is determined that the application specified by the request data is to be executed by the another computer; and transferring, to the another computer, the request data including the private address of the another computer as the destination address.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, embodiments of an information processing apparatus, an information processing system, a relay method, and a computer program according to the present invention will be described in detail with reference to the accompanying drawings.

Figure 1:
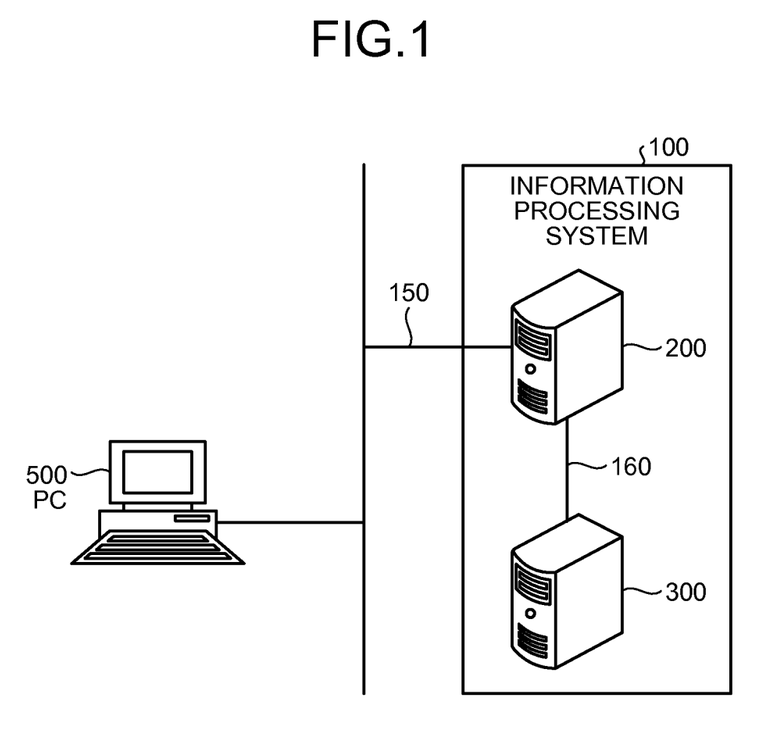
FIG. 1 is a diagram illustrating a network configuration of a system including an information processing system according to an embodiment.

FIG. 1 is a diagram illustrating a network configuration of a system including an information processing system according to an embodiment. As illustrated in FIG. 1, in this embodiment, a personal computer (PC) 500 and an information processing system 100 are connected to each other via a global network 150 such as the Internet or a LAN. Thus, an address assigned to the information processing system 100 is a global IP address.

The PC 500, with the information processing system 100 being a server, transmits request data for making various requests with respect to the information processing system 100, and receives, from the information processing system 100, response data indicating a response to what has been requested. Herein, the PC 500 specifies the global IP address of the information processing system 100 as a destination address, when transmitting the request data.

The information processing system 100 includes, as illustrated in FIG. 1, an information processing apparatus 200 and an information processing apparatus 300, and the information processing apparatus 200 and the information processing apparatus 300 are connected to each other via a private network 160. The information processing apparatus 200 is connected to the global network 150 and thus the global IP address, as is, of the information processing system 100 is an IP address of the information processing apparatus 200.

The information processing apparatus 300 is only connected to the information processing apparatus 200 via the private network 160, and not connected to the global network 150. Therefore, the information processing apparatus 300 is allocated with a private IP address only and cannot be specified with a destination IP address by the PC 500.

Figure 2:
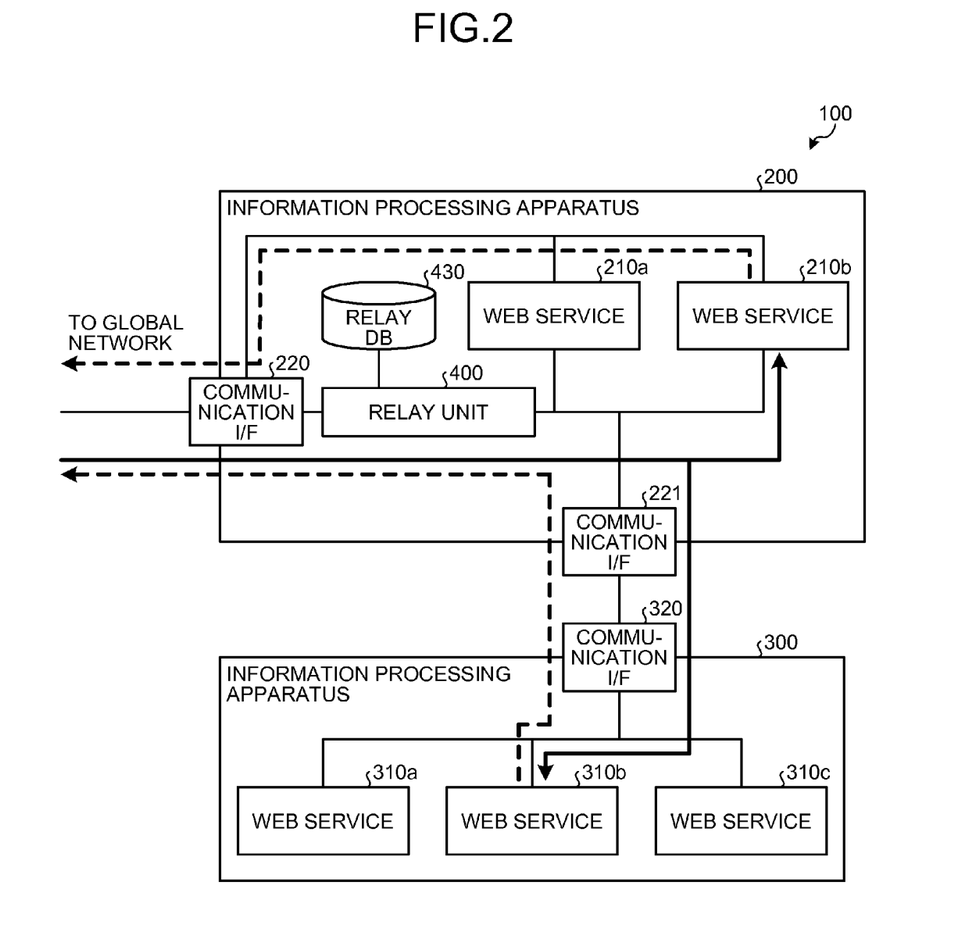
FIG. 2 is a block diagram illustrating a functional configuration of the information processing system according to the embodiment.

FIG. 2 is a block diagram illustrating a functional configuration of the information processing system 100 according to the embodiment. The information processing apparatus 200 mainly has a communication interface (I/F) 220, a communication I/F 221, a relay unit 400, a relay database 430 (hereinafter, referred to as "relay DB 430"), and Web services 210a and 210b. The Web services 210a and 210b, which are applications, operate as processes. In FIG. 2, solid-lined arrows indicate flows of the request data and broken-lined arrows indicate flows of the response data.

The communication I/F 220 is an interface for connection to the global network 150. The communication I/F 221 is an interface for connection to the private network 160. By this communication I/F 221, the information processing apparatus 200 is connected to the information processing apparatus 300 via the private network 160.

The relay unit 400 relays transfer (forwarding) of the request data, which is received from the PC 500, to the Web service 210a or 210b of the information processing apparatus 200 or a Web service 310a, 310b, or 310c of the information processing apparatus 300. Further, the relay unit 400 transmits the response data from the Web services 310a, 310b, and 310c of the information processing apparatus 300 to the global network 150. The relay DB 430 is a storage medium, such as a hard disk drive (HDD) device or a memory, which stores therein relay data to be referred to upon transfer, by the relay unit 400, of the request data to the Web service 210a, 210b, 310a, 310b, or 310c. Details of the relay unit 400 and the relay data will be described later.

The Web services 210a and 210b are applications that perform processes according to the request data from the PC 500 and generate the response data as a result of these processes.

The information processing apparatus 300 has, as illustrated in FIG. 2, a communication I/F 320 and the Web services 310a, 310b, and 310c. The Web services 310a, 310b, and 310c operate as processes.

The communication I/F 320 is an interface for connection to the private network 160. By this communication I/F 320, the information processing apparatus 300 is connected to the information processing apparatus 200 via the private network 160.

The Web services 310a, 310b, and 310c are applications that perform processes according to the request data from the PC 500 and generate the response data as a result of these processes.

Herein, each of the Web services 210a, 210b, 310a, 310b, and 310c is not necessarily allocated with a different port number and there may be any port number conflicts therebetween. In particular, there may be an allocated port number conflict between any of the Web services 210a and 210b of the information processing apparatus 200 and any of the Web services 310a, 310b, and 310c of the information processing apparatus 300.

Figure 3:
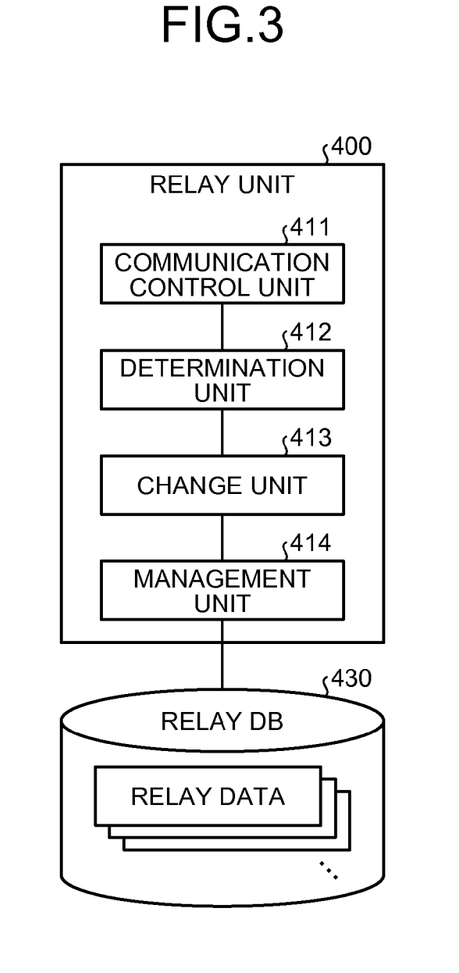
FIG. 3 is a block diagram illustrating a functional configuration of a relay unit.

Next, the details of the relay unit 400 of the information processing apparatus 200 will be described. FIG. 3 is a block diagram illustrating a functional configuration of the relay unit 400. The relay unit 400 mainly includes, as illustrated in FIG. 3, a communication control unit 411, a determination unit 412, a change unit 413, and a management unit 414. Further, FIG. 3 also has the relay DB 430 illustrated therein.

The communication control unit 411 functions as a receiving unit, and receives the request data via the global network 150 from the PC 500. Herein, the request data is specified with, as the destination address, the global IP address assigned to the information processing apparatus 200, and is data for requesting a process with respect to a Web service.

More particularly, the request data includes a transmission source IP address, a destination IP address, a transmission source port number, a destination port number, and application data. For example, if the request data is for the information processing system 100 from the PC 500, the IP address of the PC 500 is set to the transmission source IP address, and a port number of an application that has generated the request data in the PC 500 is set to the transmission source port number. Further, to the destination IP address, the global IP address of the information processing system 100 is specified, and to the destination port number, a port number of a Web service that is a service to be requested is specified. The application data is data used by the Web service.

Further, the response data generated by the Web service includes a transmission source IP address, a destination IP address, a transmission source port number, a destination port number, and a response process result.

Furthermore, the communication control unit 411 functions as a transmission unit, and transfers the request data to the Web service at the port number of the device at the designation IP address specified by the request data. Herein, as described later, if the Web service specified by the destination port number is to be executed in the information processing apparatus 300, the destination IP address is changed, by the change unit 413, to the private IP address of the information processing apparatus 300.

Further, the communication control unit 411 receives the response data from the Web service 310a, 310b, or 310c of the information processing apparatus 300 and transmits the response data to the destination IP address specified by the response data. The response data from the Web service on the information processing apparatus 200 is transmitted to the destination IP address specified by the response data, directly from the Web service 210a or 210b, without going through the relay unit 400, i.e., the communication control unit 411.

Figure 4:
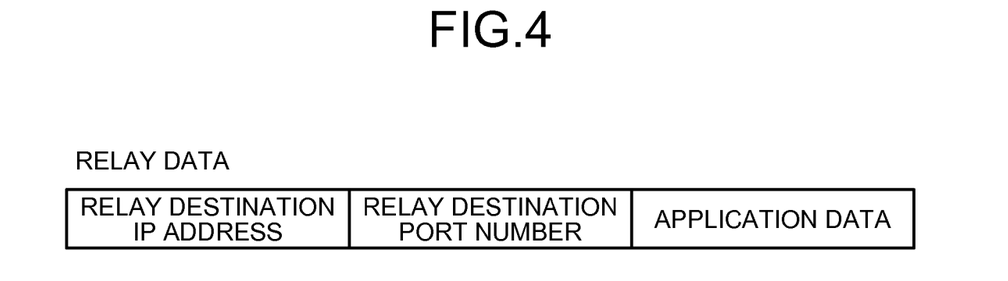
FIG. 4 is a diagram illustrating an example of a configuration of a relay data.

The number of pieces of relay data registered in the relay DB 430 corresponds to the number of Web services. Each piece of relay data is a piece of data in which information related to the Web services is registered. FIG. 4 is a diagram illustrating an example of a configuration of the relay data. The relay data have, for each Web service, as illustrated in FIG. 4, a relay destination IP address, a relay destination port number, and an application data, which are associated with one another.

The relay destination IP address is an IP address of an information processing apparatus where the Web service is executed. In the relay data of the Web services 210a and 210b, the global IP address of the information processing apparatus 200 is registered as their relay destination IP addresses. In the relay data of the Web services 310a, 310b, and 310c, the private IP address of the information processing apparatus 300 is registered as their relay destination IP addresses.

The relay destination port number is a port number for specifying the Web service. As described above, there may be a port number conflict between the Web services.

The application data is data used by the Web service. For example, if the Web service is a service application in which extended markup language (XML) data is transmitted, the application data contains an XML header (<XML> . . . </XML>) or the like. Further, if the Web service is to perform a remote diagnostic service for a printing apparatus, the application data contains a message inquiring an amount of residual ink or the like. However, these pieces of application data are just examples, and any piece of data may be used as the application data.

Returning to FIG. 3, the management unit 414 controls read and write of the relay data from and into the relay DB 430. If contents of any of the Web services are changed, a system administrator changes contents of the relay data for the corresponding Web service via the management unit 414, and if a new Web service is added within the information processing system 100, the system administrator additionally registers a piece of relay data corresponding to that new Web service via the management unit 414.

The determination unit 412 determines whether the Web service specified by the port number in the request data is to be executed by the information processing apparatus 200 or executed by the information processing apparatus 300, based on the contents of the request data received by the communication control unit 411 and the relay data. Specifically, the determination unit 412 searches, from pieces of relay data in the relay DB 430, for a piece of relay data including the relay destination port number that coincides with the port number specified by the request data, and determines which of the information processing apparatuses 200 and 300 is to execute the Web service, based on which of the IP addresses of the information processing apparatuses 200 and 300 the relay destination IP address registered in the retrieved relay data coincides with.

Since there may be any port number conflicts between the Web services, more than one piece of relay data corresponding to the port number specified by the request data may be retrieved. In that case, the determination unit 412 searches for a piece of relay data including the application data coinciding with the application data specified by the request data, from the retrieved more than one piece of relay data, and narrows down the retrieved more than one piece of relay data to select a piece of relay data. Further, the determination unit 412 determines, based on which of the IP addresses of the information processing apparatuses 200 and 300, the relay destination IP address registered in the selected piece of relay data is equivalent to, which of the processing apparatuses 200 and 300 is to execute the Web service.

If the Web service specified by the port number or the like of the request data is determined by the determination unit 412 to be executed by the information processing apparatus 300, the change unit 413 performs a rewrite process of changing the destination IP address of the request data, from the global IP address of the information processing system 100 (that is, of the information processing apparatus 200) to the private IP address of the information processing apparatus 300. Further, if the Web service specified by the port number or the like of the request data is determined by the determination unit 412 to be executed by the information processing apparatus 200, the change unit 413 does not change the destination IP address of the request data, so that the global IP address of the information processing system 100 is maintained as the destination IP address. The communication control unit 411 transfers the request data to the destination IP address specified by the request data and thus to the information processing apparatus that is to execute the Web service.

Moreover, if the response data is received by the communication control unit 411 from the information processing apparatus 300, the change unit 413 performs a rewrite process of changing the transmission source address of the received response data from the private IP address of the information processing apparatus 300 to the global IP address of the information processing apparatus 200 (that is, of the information processing system 100). As a result, the response data is preventable from remaining set with the private IP address.

Figure 5:
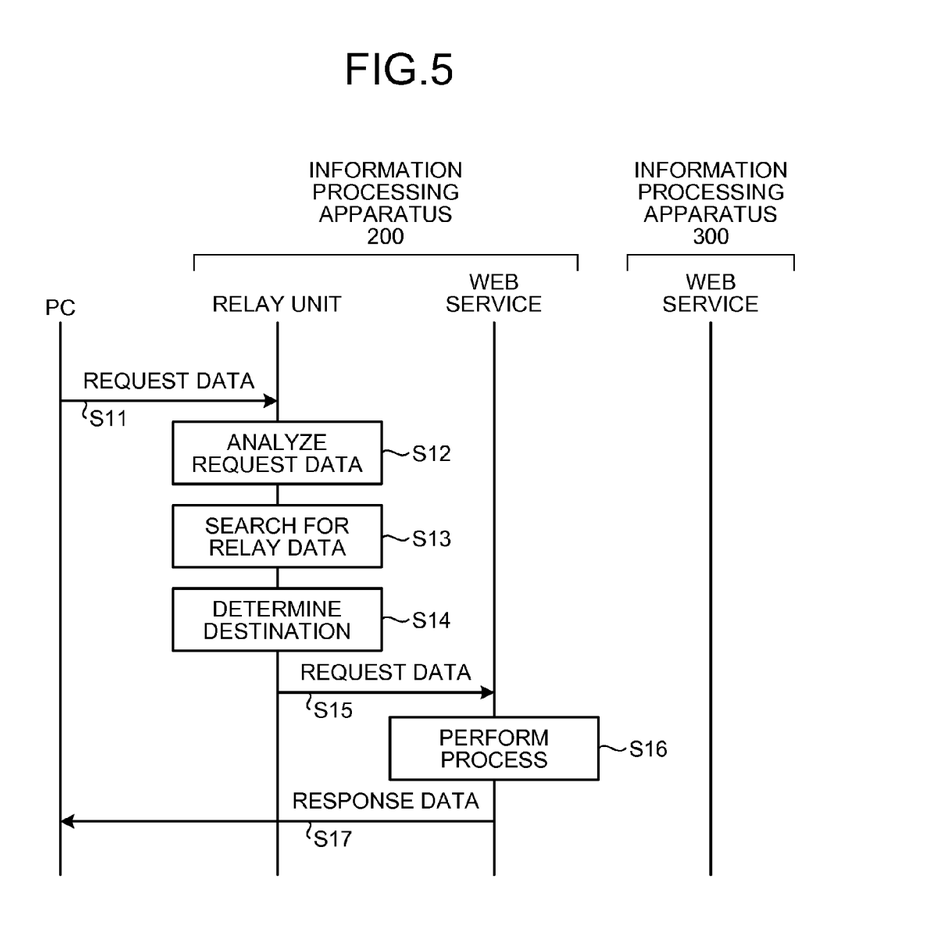
FIG. 5 is a sequence diagram illustrating a flow of a relay process.

Next, a relay process by the information processing system 100 according to the embodiment as configured above will be explained. FIG. 5 is a sequence diagram illustrating a flow of the relay process when the request data is to be transmitted to the Web service 210a or 210b on the information processing apparatus 200.

If request data is transmitted to the information processing system 100 from the PC 500 (Step S11), the communication control unit 411 of the relay unit 400 of the information processing apparatus 200 receives this request data. The determination unit 412 of the relay unit 400 then analyzes contents of the received request data (Step S12) and obtains, from the request data, a destination port number and an application data. The determination unit 412 then searches for a piece of relay data, based on the obtained destination port number and application data, from the relay DB 430 (Step S13), and determines the destination information processing apparatus 200 or 300 where the Web service is to be executed, from a relay destination IP address in the retrieved piece of relay data (Step S14).

In the example of FIG. 5, the destination is the information processing apparatus 200, and thus the communication control unit 411 transmits the request data, without changing the request data, to one of the Web services 210*a* and 210*b* in the information processing apparatus 200, the one of the Web services 210*a* and 210*b* corresponding to the destination port number (Step S15).

The Web service on the information processing apparatus 200 executes a process based on the request data (Step S16). The Web service on the information processing apparatus 200 then generates a response data as a result of the process. Herein, the Web service on the information processing apparatus 200 sets, within the response data, the global IP address of the information processing apparatus 200 as the transmission source IP address and sets the IP address of the PC 500 as the destination IP address. The Web service on the information processing apparatus 200 then transmits the response data to the PC 500, which is the transmission source of the request data (Step S17).

Figure 6:
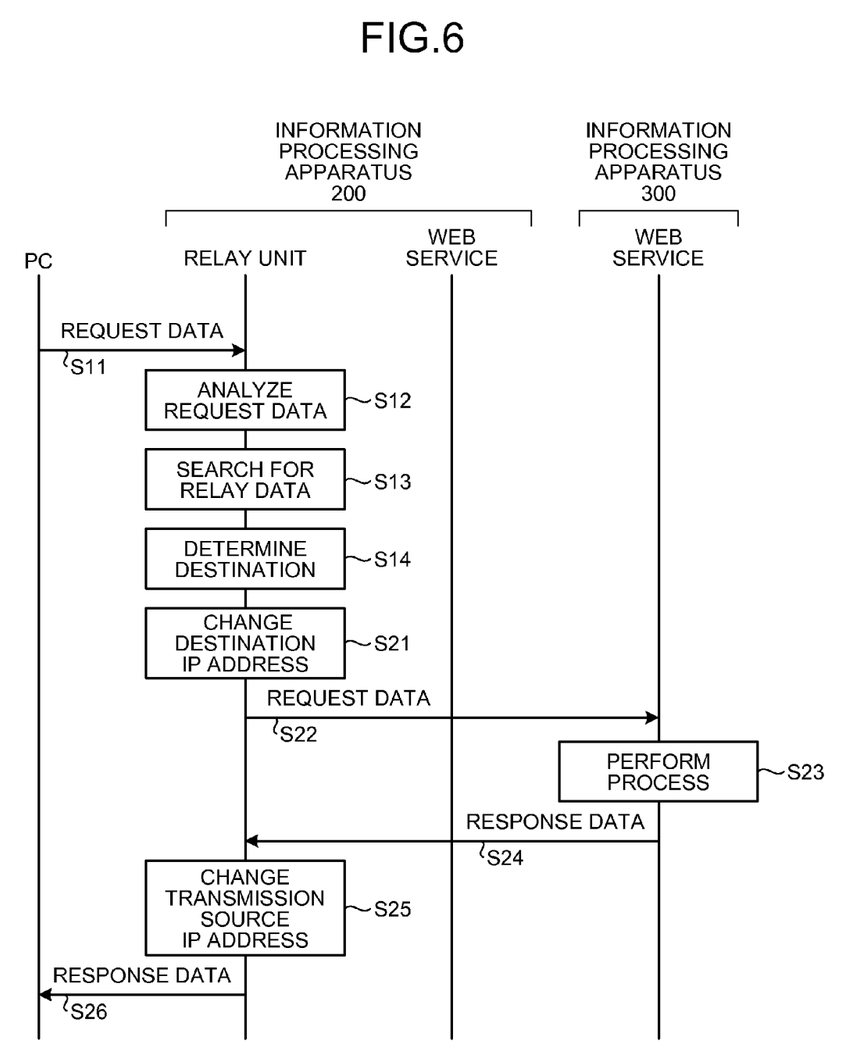
FIG. 6 is a sequence diagram illustrating another flow of the relay process.

FIG. 6 is a sequence diagram illustrating a flow of the relay process when the request data is to be transmitted to the Web service 310*a*, 310*b*, or 310*c* on the information processing apparatus 300. A process from transmission of the request data from the PC 500 to the information processing system 100 up to determination of a destination (Steps S11 to S14) is performed similarly to the process described with respect to FIG. 5.

At Step S14, if the destination at which the Web service is to be executed is determined to be the information processing apparatus 300, the change unit 413 changes the destination IP address of the request data to the private IP address of the information processing apparatus 300 (Step S21). The communication control unit 411 transmits the request data to any of the Web services 310*a*, 310*b*, and 310*c* corresponding to the destination port number, the Web services 310*a*, 310*b*, and 310*c* being in the information processing apparatus 300 (Step S22).

The Web service on the information processing apparatus 300 executes a process based on the request data (Step S23). The Web service on the information processing apparatus 300 then generates response data as a result of the process. The Web service on the information processing apparatus 300 sets, within the response data, the private IP address of the information processing apparatus 300 as the transmission source IP address and sets the IP address of the PC 500 as the destination IP address. The Web service on the information processing apparatus 300 then transmits the response data to the information processing apparatus 200 (Step S24).

Through the communication control unit 411, the relay unit 400 of the information processing apparatus 200 receives the response data, and the change unit 413 changes the transmission source IP address set in the response data to the global IP address of the information processing apparatus 200 (Step S25). The communication control unit 411 transmits the response data to the PC 500, which is the transmission source of the request data (Step S26).

Figure 7:
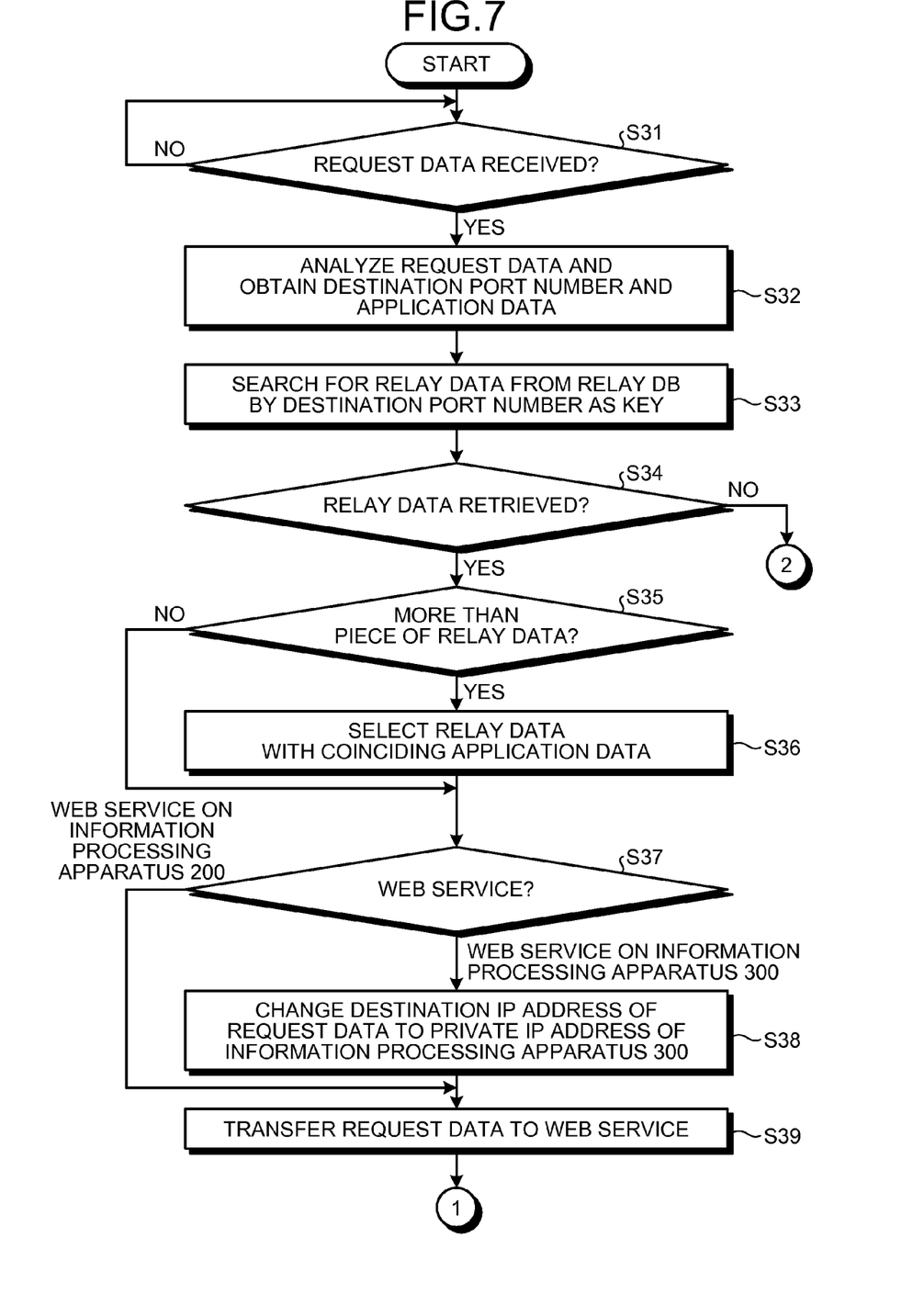
FIG. 7 is a flow chart illustrating a detailed sequence of the relay process.
Figure 8:
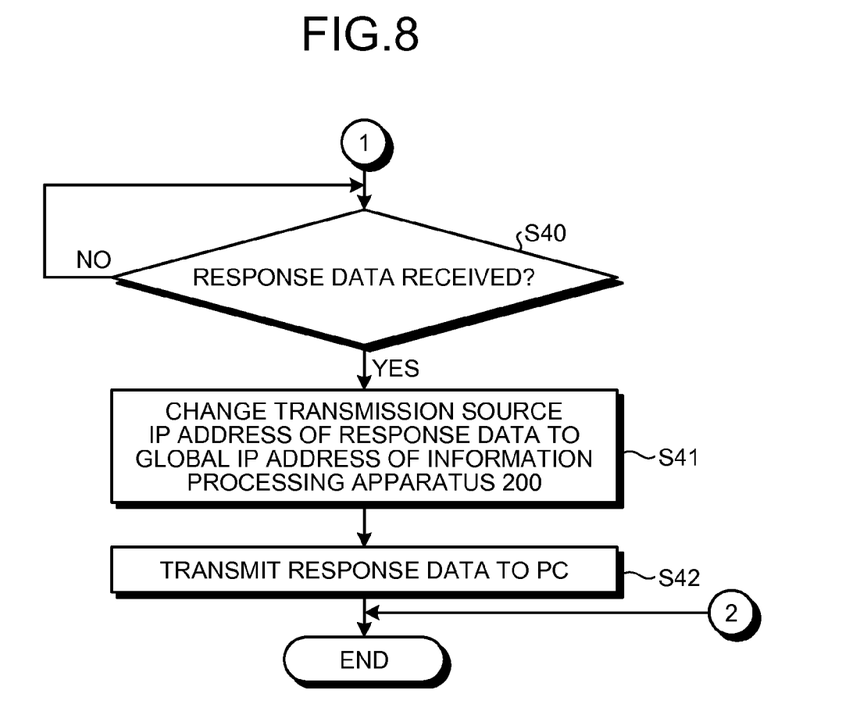
FIG. 8 is a flow chart illustrating the detailed sequence of the relay process, following that illustrated in FIG. 7.

Next, details of the relay process from Steps S12 to S25 by the relay unit 400 of the information processing apparatus 200 will be described. FIGS. 7 and 8 are flow charts illustrating a detailed sequence of the relay process from Steps S12 to S25 by the relay unit 400 of the information processing apparatus 200.

The communication control unit 411 is in a waiting state for receipt of request data (Step S31: No), and when the communication control unit 411 receives the request data from the global network 150 (Step S31: Yes), the determination unit 412 analyzes the received request data and obtains a destination port number and an application data from the request data (Step S32).

The determination unit 412 then searches for a piece of relay data from the relay DB 430 by a key, which is the destination port number (Step S33). The determination unit 412 then determines whether or not any piece of relay data has been retrieved (Step S34) and if no piece of relay data has been retrieved (Step S34: No), the determination unit 412 ends the process.

On the contrary, if any piece of relay data has been retrieved (Step S34: Yes), the determination unit 412 determines whether or not more than one piece of relay data has been retrieved (Step S35). If more than one piece of relay data has been retrieved, there is a port number conflict therein.

If more than one piece of relay data has been retrieved (Step S35: Yes), the determination unit 412 selects, from the more than one piece of relay data, the piece of relay data that has the application data coinciding with the application data obtained from the request data (Step S36). If, at Step S35, one piece of relay data is retrieved (Step S35: No), the determination unit 412 selects that one piece of relay data and skips Step S36.

Next, depending on whether the relay IP address in the selected piece of relay data is the global IP address of the information processing apparatus 200 or the private IP address of the information processing apparatus 300, the determination unit 412 determines whether the Web service specified by the destination port number in the request data is to be executed by the information processing apparatus 200 or to be executed by the information processing apparatus 300 (Step S37).

If the Web service specified by the destination port number of the request data is determined to be executed by the information processing apparatus 300 (Step S37: the Web service on the information processing apparatus 300), the change unit 413 changes the destination IP address of the request data, from the global IP address of the information processing apparatus 200, to the private IP address of the information processing apparatus 300 (Step S38).

On the contrary, if, at Step S37, the Web service specified by the destination port number in the request data is determined to be executed by the information processing apparatus 200 (Step S37: the Web service on the information processing apparatus 200), the change unit 413 does not change the destination IP address in the request data from the global IP address of the information processing apparatus 200.

Next, the communication control unit 411 transfers the request data to the Web service of the destination port number at the destination IP address of the request data (Step S39).

When the request data has been transferred to the Web service of the information processing apparatus 200, the process by the relay unit 400 ends. When the request data has been transferred to the Web service of the information processing apparatus 300, the communication control unit 411 of the relay unit 400 goes into a waiting state for reception of the response data from the Web service of the information processing apparatus 300 (Step S40: No).

If the communication control unit 411 receives the response data from the Web service of the information processing apparatus 300 (Step S40: Yes), the change unit 413 changes the specified transmission source IP address in the response data, from the private IP address of the information processing apparatus 300, to the global IP address of the information processing apparatus 200 (Step S41). The communication control unit 411 transmits, via the global network 150, the response data with the changed transmission source IP address, to the PC 500 specified by the destination IP address (Step S42).

As described, in this embodiment, using the contents of the request data received from the PC 500, that is, using not only the port number but also the application data, determination as to which of the destination information processing apparatuses 200 and 300 is to execute the Web service specified by the port number is made, and the request data is transferred to the Web service of the determined one of the information processing apparatuses 200 and 300. Therefore, according to the embodiment, even if there is a port number conflict between Web services in the devices in a private network installed within a single information processing system 100, the request data is readily assignable.

Further, in the embodiment, if the response data is from the Web service of the information processing apparatus 300, the transmission source address of the response data is changed from the private IP address of the information processing apparatus 300 to the global IP address of the information processing apparatus 200, and thus the response data is preventable from remaining set with the private IP address.

Each of the information processing apparatuses 200 and 300 includes a control device such as a CPU, a storage device such as a read only memory (ROM) or a RAM, an external storage device such as an HDD or a CD drive device, a display device such as a display, and an input device such as a keyboard or a mouse, and has a hardware configuration utilizing a normal computer.

A relay program executed by the information processing apparatus 200 according to the embodiment is provided as a file of an installable format or of an executable format, the file being stored in a computer-readable storage medium such as a CD-ROM, a flexible disk (FD), a CD-R, a digital versatile disk (DVD), or the like.

Further, a configuration may be employed, in which the relay program executed by the information processing apparatus 200 of the embodiment is provided by being stored on a computer connected to a network such as the Internet and caused to be downloaded via the network. Furthermore, a configuration may be employed, in which the relay program executed by the information processing apparatus 200 of the embodiment is provided or distributed via a network such as the Internet.

Moreover, a configuration may be employed, in which the relay program executed by the information processing apparatus 200 of the embodiment is provided being preinstalled in a ROM or the like.

The relay program executed by the information processing apparatus 200 of the embodiment has a module configuration including each of the above described units (the communication control unit 411, the determination unit 412, and the change unit 413), and in terms of actual hardware, by the CPU reading out and executing the relay program from the above mentioned recording medium, each of these units is loaded on a main storage device and the communication control unit 411, the determination unit 412, and the change unit 413 are generated on the main storage device.

For the above embodiment, an example has been explained, in which the information processing system 100 including the two information processing apparatuses 200 and 300 is allocated with the single global IP address, but the embodiment is not limited to this example. For example, the embodiment is applicable to a case in which a single global IP address is allocated to a printer apparatus including a plurality of devices.

Figure 9:
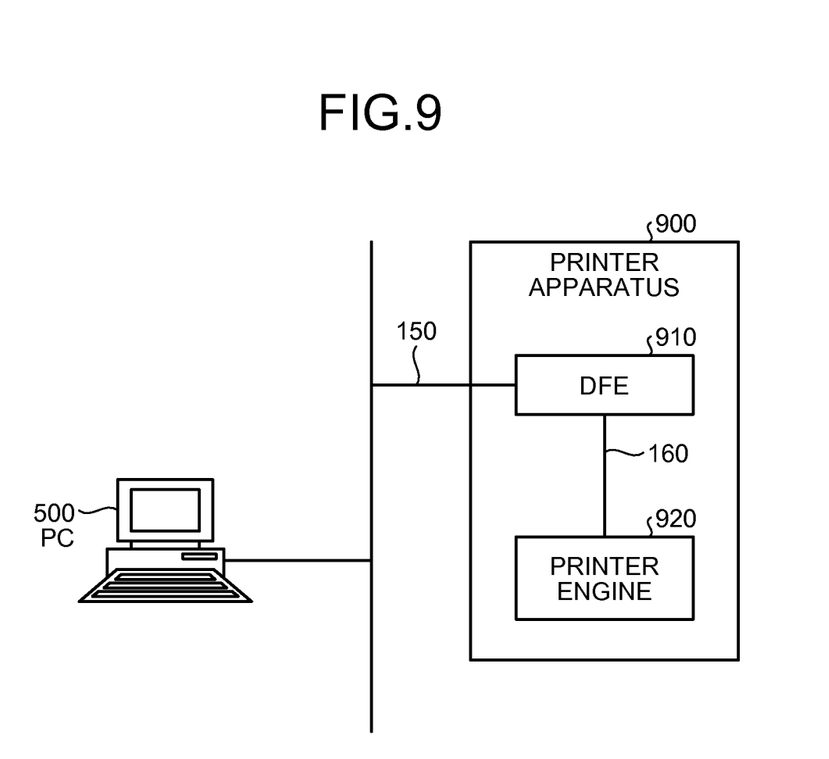
FIG. 9 is a diagram illustrating a network configuration where a single global IP address is assigned to a printer apparatus including a plurality of devices.

FIG. 9 is a diagram illustrating a network configuration where a single global IP address is allocated to a printer apparatus including a plurality of devices. In this modification, a printer apparatus 900 includes a digital front end (DFE) 910 and a printer engine 920, and the DFE 910 is connected to a PC 500 via the global network 150 such as the Internet or a LAN. Accordingly, a single global IP address is allocated to the printer apparatus 900.

Further, the DFE 910 and the printer engine 920 are connected to each other via the private network 160 and a private IP address is allocated to the printer engine 920.

In the present modified example, the DFE 910 functions similarly to the information processing apparatus 200 of FIGS. 1 and 2, and the printer engine 920 functions similarly to the information processing apparatus 300 of FIGS. 1 and 2. Herein, the DFE 910 receives, from the PC 500, data to be printed, performs a raster image processor (RIP) process on the data to be printed to generate raster data, and transmits the raster data to the printer engine 920. The printer engine 920 is an engine that prints out the raster data received from the DFE 910 onto a recording medium.

According to the embodiments, even if devices installed in a single apparatus and within a private network execute applications that use a same port number among these applications, assigning of communication data is readily possible.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus, comprising:
   a receiving unit configured to receive processing request data with respect to a Web service via a global network, the processing request data including a global address specified as a destination address, a port number, and a Web message to be used by a specified Web service, wherein the global address is allocated to the information processing apparatus connected to the global network;
   a determination unit configured to determine, based on the processing request data, whether the Web service specified by the processing request data is to be executed by another information processing apparatus connected via a private network and allocated with a private address;
   a change unit configured to change the destination address in the processing request data from the global address of the information processing apparatus to the private address of the another information processing apparatus when the determination unit determines that the Web service specified by the processing request data is to be executed by the another information processing apparatus;

a transmission unit configured to transfer, to the another information processing apparatus, the processing request data including the private address of the another information processing apparatus as the destination address; and a storage unit configured to store therein pieces of relay data for respective Web services, each piece of relay data including a relay destination port number, a relay destination address, and a Web message to be used by the corresponding Web service;

the determination unit is configured to retrieve one or more pieces of relay data from the storage unit that include a relay destination port number coinciding with the port number specified in the processing request data when one piece of relay data is retrieved, the determination unit is configured to select the one piece of relay data when two or more pieces of relay data are retrieved, the determination unit is configured to select a piece of relay data from the two or more pieces of relay data that includes a Web message coinciding with the Web message specified by the processing request data;

the determination unit is configured to determine that the Web service specified by the processing request data is to be executed by the another information processing apparatus when the relay destination address included in a selected piece of relay data is the private address of the another information processing apparatus.

2. The information processing apparatus according to claim 1, wherein the change unit is configured not to change the destination address in the processing request data when the Web service specified by the processing request data is to be executed by the information processing apparatus, and the transmission unit is configured to transfer the processing request data to a Web service on the information processing apparatus.

3. The information processing apparatus according to claim 1, wherein the receiving unit is configured to receive, from the another information processing apparatus, response data generated by the Web service executed in the another information processing apparatus, the change unit is configured to change a transmission source address of the response data received from the another information processing apparatus, from the private address of the another information processing apparatus to the global address of the information processing apparatus, and the transmission unit is configured to transmit, to the global network, the response data including the global address of the information processing apparatus as the transmission source address.

4. The information processing apparatus according to claim 3, wherein the transmission unit is configured to transmit as is, to the global network, the response data generated by a Web service executed in the information processing apparatus.

5. A relay method executed by an information processing apparatus connected to a global network, the relay method comprising:

storing, on a storage unit, pieces of relay data for respective Web services, each piece of relay data including a relay destination port number, a relay destination address, and a Web message to be used by the corresponding Web service;

receiving processing request data with respect to a Web service via the global network, the processing request data including a global address specified as a destination address, a port number, and a Web message to be used by a specified Web service, wherein the global address is allocated to the information processing apparatus;

determining, based on the processing request data, whether the Web service specified by the processing request data is to be executed by another information processing apparatus connected via a private network and allocated with a private address, wherein the step of determining includes:

retrieving, from the storage unit, one or more pieces of relay data that include a relay destination port number coinciding with the port number specified in the processing request data, selecting, when one piece of relay data is retrieved, the one piece of relay data selecting, when two or more pieces of relay data are retrieved, a piece of relay data from the two or more pieces of relay data that includes the Web message coinciding with the Web message specified by the processing request data, and determining that the Web service specified by the processing request data is to be executed by the another information processing apparatus when the relay destination address of the selected piece of relay data is the private address of the another information processing apparatus;

changing the destination address in the processing request data from the global address of the information processing apparatus to the private address of the another information processing apparatus when it is determined that the Web service specified by the processing request data is to be executed by the another information processing apparatus; and transferring, to the another information processing apparatus, the processing request data including the private address of the another information processing apparatus as the destination address.

6. A non-transitory computer-readable storage medium with an executable program stored thereon and executed by a computer connected to a global network, wherein the program instructs the computer to perform:

storing, on a storage unit, pieces of relay data for respective Web services, each piece of relay data including a relay destination port number, a relay destination address, and a Web message to be used by the corresponding Web service;

receiving processing request data with respect to a Web service via the global network, the processing request data including a global address specified as a destination address, a port number, and a Web message to be used by a specified Web service, wherein the global address is allocated to the computer;

determining, based on the processing request data, whether the Web service specified by the processing request data is to be executed by another computer connected via a private network and allocated with a private address, wherein the step of determining includes:

retrieving, from the storage unit, one or more pieces of relay data that include a relay destination port number coinciding with the port number specified in the processing request data, selecting, when one piece of relay data is retrieved, the one piece of relay data selecting, when two or more pieces of relay data are retrieved, a piece of relay data from the two or more pieces of relay data that includes the Web message coinciding with the Web message specified by the processing request data, and determining that the Web service specified by the processing request data is to be executed by the another computer when the relay destination address of the selected piece of relay data is the private address of the another computer;

changing the destination address in the processing request data from the global address of the computer to the private address of the another computer when it is determined that the Web service specified by the processing request data is to be executed by the another computer; and transferring, to the another computer, the processing request data including the private address of the another computer as the destination address.

* * * * *